(12) United States Patent
Kapur et al.

(10) Patent No.: US 10,860,368 B2
(45) Date of Patent: Dec. 8, 2020

(54) MIGRATING WORKLOADS IN MULTICLOUD COMPUTING ENVIRONMENTS

(71) Applicant: Juniper Networks, Inc., Sunnyvale, CA (US)

(72) Inventors: Sukhdev S. Kapur, Saratoga, CA (US); Sanju C. Abraham, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 103 days.

(21) Appl. No.: 16/145,800

(22) Filed: Sep. 28, 2018

(65) Prior Publication Data
US 2020/0104161 A1    Apr. 2, 2020

(51) Int. Cl.
*G06F 9/48* (2006.01)
*G06F 9/455* (2018.01)
*G06F 11/07* (2006.01)

(52) U.S. Cl.
CPC ........ *G06F 9/4856* (2013.01); *G06F 9/45558* (2013.01); *G06F 11/0712* (2013.01); *G06F 2009/4557* (2013.01); *G06F 2009/45595* (2013.01)

(58) Field of Classification Search
CPC .................................................... G06F 9/4856
USPC ......................................................... 718/105
See application file for complete search history.

(56) References Cited

U.S. PATENT DOCUMENTS

| | | |
|---|---|---|
| 9,226,333 B2 | 12/2015 | Steiner et al. |
| 9,571,394 B1 | 2/2017 | Sivaramakrishnan |
| 9,967,267 B2 * | 5/2018 | Ladnai .................... H04L 63/20 |
| 10,180,809 B2 | 1/2019 | Fetik |
| 10,296,374 B2 | 5/2019 | Dai et al. |
| 10,374,887 B2 | 8/2019 | Kerpez et al. |
| 10,416,986 B2 | 9/2019 | Mukhopadhyay et al. |
| 2012/0110186 A1 | 5/2012 | Kapur et al. |

(Continued)

FOREIGN PATENT DOCUMENTS

| | | |
|---|---|---|
| EP | 3264691 A1 | 1/2018 |
| WO | 2013184846 A1 | 12/2013 |

OTHER PUBLICATIONS

Suen et al., Efficient Migration of Virtual Machines between Public and Private Cloud, 2011, IEEE, pp. 540-553. (Year: 2011).*

(Continued)

*Primary Examiner* — John Q Chavis
(74) *Attorney, Agent, or Firm* — Shumaker & Sieffert, P.A.

(57) ABSTRACT

Techniques are described for detecting failure of one or more virtual computing environments and causing a migration of workloads. In some examples, a computing system includes a storage medium and processing circuitry having access to the storage medium. The processing circuitry is configured to communicate with a plurality of virtual computing environments (VCEs), including a first VCE and a second VCE, wherein each of the plurality of VCEs is operated by a different public cloud provider. The processing circuitry is further configured to deploy a group of workloads to the first VCE, detect a failure of at least a portion of the first VCE, and output, to the first VCE and responsive to detecting the failure, an instruction to transfer a set of workloads of the group of workloads to the second VCE to thereby cause a migration of the set of workloads to the second VCE.

20 Claims, 5 Drawing Sheets

(56) References Cited

U.S. PATENT DOCUMENTS

| | | | | |
|---|---|---|---|---|
| 2012/0311568 A1* | 12/2012 | Jansen | ................ | G06F 9/45558 |
| | | | | 718/1 |
| 2013/0036213 A1* | 2/2013 | Hasan | ................ | H04L 67/1097 |
| | | | | 709/223 |
| 2014/0006482 A1* | 1/2014 | Raghu | .................... | H04L 67/10 |
| | | | | 709/203 |
| 2014/0006844 A1* | 1/2014 | Alderman | ........... | H04L 41/5096 |
| | | | | 714/4.1 |
| 2014/0201365 A1* | 7/2014 | Ashok | .................. | H04L 45/302 |
| | | | | 709/225 |
| 2015/0281006 A1 | 10/2015 | Kasturi et al. | | |
| 2015/0363219 A1 | 12/2015 | Kasturi et al. | | |
| 2017/0126479 A1* | 5/2017 | Vangheepuram | ... | H04L 41/0654 |
| 2017/0364422 A1 | 12/2017 | Antony et al. | | |
| 2017/0366983 A1* | 12/2017 | Gunasekara | .......... | H04W 24/08 |
| 2018/0152390 A1* | 5/2018 | Loomba | .............. | H04L 67/1031 |
| 2018/0181418 A1* | 6/2018 | Elangovan | ............ | H04L 47/746 |
| 2018/0225311 A1* | 8/2018 | Bandopadhyay | ... | G06F 16/9024 |
| 2018/0270130 A1 | 9/2018 | Wang et al. | | |
| 2018/0276041 A1* | 9/2018 | Bansal | ................ | G06F 11/3414 |
| 2018/0276044 A1* | 9/2018 | Fong | .................... | G06F 9/5044 |
| 2019/0026095 A1 | 1/2019 | Mukhopadhyay et al. | | |

OTHER PUBLICATIONS

Extended Search Report from counterpart European Application No. 19182033.1, dated Dec. 10, 2019, 10 pp.

U.S. Appl. No. 16/144,711, by Juniper Networks, Inc. (Inventor: Sanju C. Abraham), filed Sep. 27, 2018.

Response to Extended Search Report dated Dec. 10, 2019 from counterpart European Application No. 19182033.1, filed Oct. 1, 2020, 18 pp.

* cited by examiner

MIGRATING WORKLOADS IN MULTICLOUD COMPUTING ENVIRONMENTS

TECHNICAL FIELD

The disclosure relates to networking, and more particularly, managing workloads in a multi-cloud environment.

BACKGROUND

In a typical cloud data center environment, there is a large collection of interconnected servers that provide computing and/or storage capacity to run various applications. For example, a data center may include a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtual machines are a virtualization scheme based on machine-level virtualization. Virtual machines include a guest operating system that runs on a hypervisor of the host computing device to emulate the hardware of a computer to provide a new computer environment for executing applications.

Containerization is a virtualization scheme based on operation system-level virtualization. Containers are lightweight and portable execution environments for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same cloud environment, with communication enabled among the diverse deployments of applications. The container network should also be agnostic to work with the multiple types of orchestration platforms that are used to deploy containerized applications.

A cloud computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable communication among applications running on virtual execution environments, such as containers or VMs, as well as among applications running on legacy (e.g., physical) environments. Software-defined networking contributes to network management.

Multi-cloud environment refers to the use of multiple clouds for computing and storage services. An enterprise may utilize an on-premise computing and/or storage service (e.g., on-premises cloud), and one or more off-premise clouds such as those hosted by third-party providers. Examples of the clouds include private, public, or hybrid public/private clouds that allow for ease of scalability while allowing different levels of control and security. An enterprise may utilize one or more of private, public, or hybrid public/private clouds based on the types of applications that are executed and other needs of the enterprise.

SUMMARY

In general, this disclosure describes examples where a disaster recovery controller monitors health of a plurality of virtual computing environments (VCEs) and triggers the migration of workloads between VCEs that are operated by different cloud service providers. More specifically, techniques of this disclosure enable the disaster recovery controller to determine that one or more VCEs of the plurality of VCEs are offline or otherwise fully or partially unavailable and output an instruction to migrate workloads from the one or more affected VCEs to other VCEs that are online. Heartbeat agents, which may include virtual machines (VMs) executed by the plurality of VCEs, may emit heartbeat signals indicating that the respective VCEs are online. By the same token, omissions of heartbeat signals by the plurality of heartbeat agents may be indicative of a system failure in at least one of the plurality of VCEs. The disaster recovery controller may be configured to receive the heartbeat signals and detect that a VCE is offline by identifying heartbeat signal omissions.

In some examples, the plurality of VCEs may define a multi-cloud environment configured for the execution of applications and services associated with a customer. As such, by using the multi-cloud environment, the customer may deploy workloads to each of the plurality of VCEs, where each VCE of the plurality of VCEs is operated by a different cloud service provider. In the event of a system failure in at least one VCE of the plurality of VCEs, at least some applications and services associated with the customer may become inoperable. For example, if the customer is a video streaming provider, users of the video streaming provider may be unable to stream videos if at least one VCE fails. Consequently, by migrating pertinent workloads from dysfunctional offline VCEs to functional online VCEs, at least some applications and services associated with customers using the multi-cloud environment may be restored to operability. Additionally, in some examples, each VCE may determine a hierarchy of workloads, with "more important" workloads being given precedence for migration over "less important" workloads.

The techniques may provide one or more technical advantages. For example, by detecting that at least one VCE of the plurality of VCEs is offline, the disaster recovery controller may quickly and efficiently output an instruction to migrate workloads from the offline VCE to other VCEs that are online and operational. Consequently, an amount of time that applications and services associated with the migrated workloads are inoperable may be decreased, since the workloads are quickly migrated to functional VCEs configured for executing the workloads. As another example, by prioritizing some workloads in each VCE as "more important," the offline VCEs may more efficiently migrate workloads to online VCEs by decreasing an amount of data that must be transferred.

In one example, a computing system includes a storage medium; and processing circuitry having access to the storage medium. The processing circuitry is configured to communicate with a plurality of virtual computing environments (VCEs), including a first VCE and a second VCE, where each of the plurality of VCEs is operated by a different public cloud provider, deploy a group of workloads to the first VCE, detect a failure of at least a portion of the first VCE, and output, to the first VCE and responsive to detecting the failure, an instruction to transfer a set of workloads of the group of workloads to the second VCE to thereby cause a migration of the set of workloads to the second VCE.

In another example, a method includes communicating, by processing circuitry, with a plurality of virtual computing environments (VCEs), including a first VCE and a second VCE, where each of the plurality of VCEs is operated by a different public cloud provider. The method further includes deploying a group of workloads to the first VCE, detecting a failure of at least a portion of the first VCE, and outputting, to the first VCE and responsive to detecting the failure, an instruction to transfer a set of workloads of the group of workloads to the second VCE, thereby causing a migration of the set of workloads to the second VCE.

In another example, a non-transitory computer medium including instructions for causing one or more processors to communicate with a plurality of virtual computing environments (VCEs), including a first VCE and a second VCE, where each of the plurality of VCEs is operated by a different public cloud provider, deploy a group of workloads to the first VCE, detect a failure of at least a portion of the first VCE, and output, to the first VCE and responsive to detecting the failure, an instruction to transfer a set of workloads of the group of workloads to the second VCE, thereby causing a migration of the set of workloads to the second VCE.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
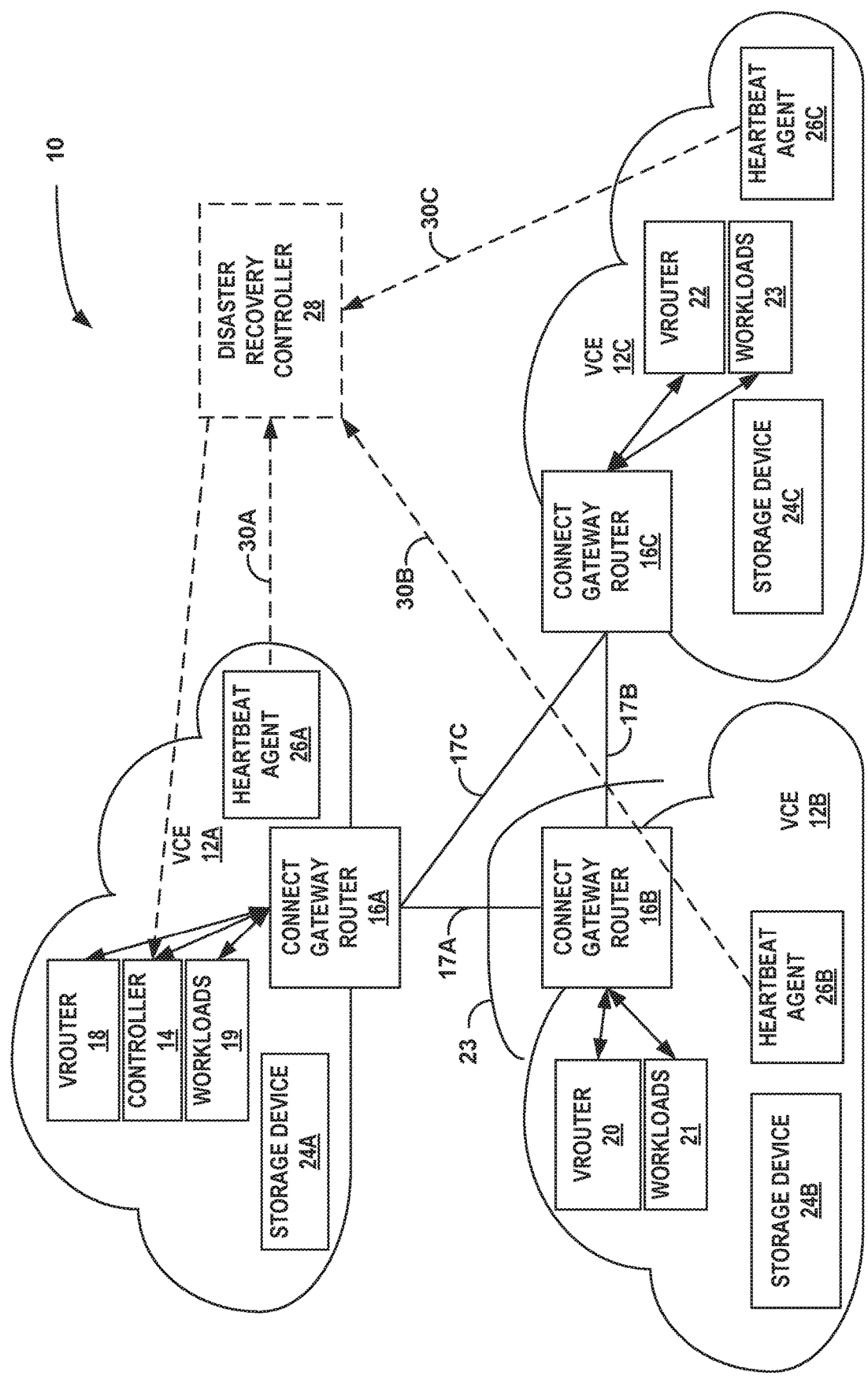
FIG. 1 is a block diagram illustrating an example multi-cloud network configured to communicate in accordance with one or more example techniques described in this disclosure.

FIG. 1 is a block diagram illustrating an example multi-cloud network configured to communicate in accordance with one or more example techniques described in this disclosure. As illustrated, multi-cloud network 10 includes virtual computing environments (VCEs) 12A-12C (collectively VCEs 12). VCEs 12 may be provisioned within a public, private, hybrid, or other "cloud" that provides storage and compute for various applications. For example, a plurality of workloads (e.g., workloads 19, workloads 21, and workloads 23) may be deployed to VCEs 12, the plurality of workloads representing work that may be performed by applications, services, or the like. A cloud may refer to computing infrastructure that may be virtualized to support one or more virtual computing environments provisioned thereon or may also or alternatively refer to a virtual computing environment itself. For instance, VCEs 12 may be provisioned on a plurality of servers hosted on a network (e.g., Internet) to store, manage, and process data, rather than on a personal computer. In some examples, one or more of VCEs 12 may be on-premises of an enterprise, and the other VCEs 12 are remote. In some examples, all of VCEs 12 may be remote from the enterprise. In some examples, at least one of VCEs 12 comprises a virtual private cloud (VPC) operated by a cloud service provider.

A tenant (e.g., enterprise or individual) may use one or more VCEs 12 to offload storage or computation capabilities that can be handled faster or more efficiently on the servers of VCEs 12. For example, VCEs 12 provide access to much more memory and/or other storage than would be available on a personal computer, or within a server located on-premises. VCEs 12 may also provide much more compute power, to handle complex tasks such as large data processing, than would be available on a personal computer, or within a server located on-premises. Moreover, VCEs 12 provide redundancy storage. Accordingly, tenants are increasingly relying on networks such as multi-cloud network 10.

However, there may be technical problems with management of VCEs 12. VCEs 12 may be located in various locations throughout the world. A tenant may need data from one of VCEs 12 to be transmitted to another one of VCEs 12. Therefore, an administrator needs to establish communication links between each of VCEs 12 to allow for such communication. Due to the remote locations of VCEs 12, datacenters that house the servers that host VCEs 12 tend to have different administrators or technical specifications that require each respective VCEs 12 to be configured to communicate with other VCEs 12.

Moreover, each one of VCEs 12 hosts multiple different tenants. Therefore, additional technical problems may arise to ensure communication security. For instance, VCE 12A may host services for a first and a second tenant, and VCE 12B may host services for the first and a third tenant. Any data transmitted by VCE 12A for the first tenant to VCE 12B should not be accessible by the third tenant, and any data transmitted by VCE 12B for the first tenant to VCE 12A should not be accessible by the second tenant, unless appropriate circumstances and/or authorizations dictate otherwise.

Each VCE of VCEs 12 may be operated by a different cloud service provider. In some examples, the cloud service providers operating VCEs 12 may include administrators of VPCs such as Amazon Web Services (AWS), Google Cloud Platform (GCP), Microsoft Azure, or the like. Additionally, or alternatively, at least one of VCEs 12 may be operated by a tenant of VCE 12s themselves. For example, a tenant may operate an onsite, or "on premises" cloud that defines a VCE (e.g., VCE 12A) and the tenant may also subscribe to the services of one or more cloud service providers that operate offsite clouds (e.g., VPCs) given by VCE 12B and VCE 12C. Put another way, multi-cloud network 10 is comprised of a plurality of VCEs 12 that are interconnected to communicate with each other, where each VCE of VCEs 12 is operated by a different organization.

Each individual VCE may include a plurality of clouds. In some examples, a VCE (e.g., VCE 12B) may include a plurality of clouds that are dispersed over a wide geographical area. The cloud service provider of the individual VCE 12B may possess the ability to migrate workloads 21 between clouds within VCE 12B itself. However, events may occur in which at least a portion of VCE 12B fails. A number of events may contribute to the failure of VCE 12B, such as any combination of a natural disaster (e.g., an earthquake, hurricane, or the like), a power failure, and a security breach. In the case that VCE 12B partially or completely goes offline, tenants of VCE 12B may experience failure in their systems. In one example, a video streaming service may operate a website which enables customers to access the website and select videos for viewing. The video streaming service may deploy at least one workload associated with the website to VCE 12B. After VCE 12B goes offline, due to failure for example, customers of the video streaming service may be unable to reach the website or view at least one video linked on the website. In order to quickly and efficiently transfer workloads, techniques of this disclosure may enable the migration of workloads between VCEs 12 (e.g., a transfer of at least some of workloads 21 from VCE 12B to any combination of VCE 12A and VCE 12C) such that the workloads may be migrated from a first VCE operated by a first cloud service provider to a second VCE operated by a second cloud service provider. Consequently, during an event in which a particular VCE of VCEs 12 is unable to execute a group of workloads deployed to the particular VCE, at least some of the group of workloads may be migrated to a functional VCE operated by a different cloud service provider.

This disclosure describes examples of a controller (e.g., controller 14) that may allow an administrator, with a single pane of glass user interface, to control the interconnections and security within multi-cloud network 10. For example, controller 14, which may be a software-defined networking (SDN) controller, offers a standards-based networking and network isolation software for physical, virtual, container, and next generation server-less environments. Controller 14 may be centralized and/or provide multi-dimension segmentation and policy enforcement for workloads deployed in physical, virtual, container, and server-less environments. For instance, controller 14 may provide connectivity across VCEs 12 and enables policy based secure routing, connectivity, and data path encryption across hybrid clouds, multi-region and site, and compute infrastructure.

In some examples, controller 14 executes on a computing device operated by a network administrator or other authorized user associated with a particular tenant. However, the cloud (e.g., one or more VCEs 12) may be considered as simply another physical location (or locations), although operating in a virtualized environment. Therefore, controller 14 need not necessarily execute on a computing device that a network administrator is accessing and/or operating but could be executing in a virtualized environment within any of VCEs 12.

The network administrator may interface with only controller 14 to establish proper, secure communication links for the multi-cloud tenants and/or the network administrator's tenants. For example, some other techniques would require the network administrator to interface with a first controller for VCE 12A, a second controller for VCE 12B, and so forth. With the example techniques, the network administrator might interface with only controller 14 via a single pane of glass to establish the communication links between VCEs 12.

As illustrated, VCE 12A includes controller 14, connect gateway router 16A, virtual router ("vrouter") 18, workloads 19, storage device 24A, and heartbeat agent 26A. VCE 12B includes connect gateway router 16B, virtual router ("vrouter") 20, workloads 21, storage device 24B, and heartbeat agent 26B. VCE 12C includes connect gateway router 16C, virtual router ("vrouter") 22, workloads 23, storage device 24C, and heartbeat agent 26C. Although VCE 12A, VCE 12B and VCE 12C are each shown as having a single vrouter (e.g., vrouter 18, vrouter 20, and vrouter 22, respectively), VCEs 12 may each include a plurality of vrouters. For example, if VCE 12A, VCE 12B, and VCE 12C are implemented across multiple servers, each server may execute a corresponding vrouter. Examples of connect gateway routers 16A-16C (collectively, "connect gateway routers 16") and vrouters 18, 20, and 22 are described in more detail below. In general, connect gateway routers 16 and vrouters 18, 20 and 22 are software applications executing on respective servers within remote data centers. In one or more examples, connect gateway routers 16 form as logical endpoints for respective VCEs 12. For example, connect gateway routers 16 are configured to route data from respective VCEs 12 to other VCEs 12. Additionally, Workloads 19, 21, and 23 represent work performed by applications and services associated with customers of multi-cloud network 10. Such workloads may be executed by respective vrouters 18, 20 and 22 and physical servers (not pictured).

Each of connect gateway routers 16 may represent an Amazon Web Services VPC virtual gateway, a Google Cloud Router, or a Tungsten Fabric or Contrail or Open-Contrail Gateway, or other software gateway for a virtual computing environment, for example.

Once data reaches one of VCEs 12, connect gateway routers 16 might not be configured to further route the communication within the respective VCEs 12. However, the example techniques are not so limited, and connect gateway routers 16 may be configured to further route the communication within the respective VCEs 12.

In one or more examples, controller 14 (e.g., a single controller 14) may be configured to establish communication links between VCEs 12. In this manner, controller 14 may be configured to establish a full mesh of communication tunnels that interconnect VCEs 12. In the example illustrated in FIG. 1, connect gateway routers 16A and 16B are connected via tunnel 17A, connect gateway routers 16B and 16C are connected via tunnel 17B, and connect gateway routers 16C and 16A are connected via tunnel 17C. In this manner, tunnels 17A-17C represent a full mesh of communication tunnels for VCEs 12 to communicate with one another. In this way, each one of connect gateway routers 16 forms a logical endpoint within a logical tunnel mesh for respective VCEs 12.

Tunnels 17 may be logical tunnels in that tunnels 17 from an overlay over an underlay of physical connections. As one example, tunnels 17 may be formed over the Internet. Therefore, tunnels 17 represent the manner in which VCEs 12 may be interconnected through the Internet, regardless of the particular underlaying hardware components of the Internet tunnels 17 utilize for communication.

There may be various example ways in which controller 14 establish tunnels 17. As one example, controller 14 utilizes Internet Protocol Security (IPSec) sessions or secure sockets layer (SSL) protocol or transport layer security (TLS) protocol between connect gateway routers 16 to establish tunnels 17 so that VCEs 12 can communicate via the Internet. In some examples, controller 14 may utilize IPSec sessions between vrouter 20 and vrouter 22, and possibly vrouter 18, for communication via the Internet. As one example, controller 14 establishes an IPSec session between vrouter 20, vrouter 22, and controller 14 in examples where controller 14 is either in a public or private cloud and vrouters 20, 22 are deployed across geographically distributed environments. In examples where controller 14 establishes tunnels 17 via IPSec sessions, each one of respective connect gateway routers 16 vrouters 20 and 22 may communicate using user datagram (UDP) encapsulated in encapsulating security payload (ESP) packets.

As seen in the example of FIG. 1, VCE 12B and VCE 12C include virtual router 20 ("vrouter 20") and virtual router 22 ("vrouter 22"), respectively, which execute one or more routing instances for corresponding virtual networks within multi-cloud network 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 20 and virtual router 22 of VCEs 12B and 12C, for instance, may include an outer header to allow the physical network fabric to tunnel the payload or "inner packet" to a physical network address for a network interface card that executes the virtual router. The outer header may include not only the physical network address of the network interface card of the server but also a virtual network identifier such as a VxLAN tag or Multi-protocol Label Switching (MPLS) label that identifies one of the virtual networks as well as the corresponding routing instance executed by the virtual router. An inner packet includes an inner header having a destination network address that conforms to the virtual network addressing space for the virtual network identified by the virtual network identifier.

Virtual routers 20 and 22 terminate virtual network overlay tunnels and determine virtual networks for received packets based on tunnel encapsulation headers for the packets, and forwards packets to the appropriate destination virtual network endpoints for the packets. For VCE 12B, for example, for each of the packets outbound from virtual network endpoints hosted by VCE 12B, the virtual router 20 attaches a tunnel encapsulation header indicating the virtual network for the packet to generate an encapsulated or "tunnel" packet, and virtual router 20 outputs the encapsulated packet via overlay tunnels for the virtual networks to a physical destination computing device, such as another one of VCEs 12. As used herein, a virtual router (e.g., virtual router 20 or virtual router 22) may execute the operations of a tunnel endpoint to encapsulate inner packets sourced by virtual network endpoints to generate tunnel packets and decapsulate tunnel packets to obtain inner packets for routing to other virtual network endpoints.

By establishing the logical tunnel mesh, controller 14 may be configured to determine one or more logical tunnels from the logical tunnel mesh to establish one or more communication links between a first VCE and a second VCE. As one example, as part of establishing the logical tunnel mesh, controller 14 may determine that tunnel 17A is a communication link for VCEs 12A and 12B to communicate with one another, tunnel 17B is a communication link for VCEs 12B and 12C to communicate with one another, and tunnel 17C is a communication link for VCEs 12C and 12A to communicate with one another.

In addition to establishing logical tunnel mesh, controller 14 may be configured to advertise routes via the tunnels 17 to VCEs 12. There may be various ways in which controller 14 advertises routes via tunnels 17. As one example, controller 14 advertises routes via broadcast gateway protocol (BGP). In other words, route advertisements for IPSec tunnel establishment is done via BGP.

Controller 14 may further be configured to ensure secure communication between VCEs 12. For instance, as described above, secure communication may be needed to ensure that unintended entities are unable to peer into communication. As one example, VCE 12C may be private cloud that is specifically configured with established security to form a private secure network. As one example, VCE 12B is a cloud that is deployed behind a firewall illustrated conceptually as firewall 23.

As described above, in some examples, controller 14 establishes the logical tunnel mesh using IPSec sessions. Controller 14 may generate certificates based on specific entitlement used in the Internet Key Exchange (IKE) phase of the IPSec tunnel establishment.

To further ensure secure communication, controller 14 may be configured to maintain security policies that indicate which tunnels 17 are specifically configured to carry encrypted or otherwise secure communications. Controller 14 may include a bit in the policy enforcement framework that is enabled per flow. The status of the bit indicates whether workload packets (e.g., data) is communicated through secure tunnels for secured forwarding.

Since VCEs 12 are susceptible to failure, techniques of this disclosure may enable the migration of data between VCEs 12 in the event that a VCE of VCEs 12 (e.g., VCE 12B) goes offline, wherein each VCE of VCEs 12 is operated by a different cloud service provider.

Workloads represent work that may be performed by applications, services, or the like. As such, workloads may represent work performed by any combination of VMs, containers, Kubernetes pods, and the like which form applications and services. As illustrated in FIG. 1, workloads 19, workloads 21, and workloads 23 are deployed to VCE 12A, VCE 12B, and VCE 12C, respectively. Workloads associated with a particular tenant may be deployed to any combination of VCEs 12. In one example, workloads 21 are executed by computing infrastructure of VCE 12A, which includes one or more virtual routers (e.g., vrouter 18), virtual servers, or physical servers. By the same token, workloads 21 are executed by computing infrastructure of VCE 12B and workloads 23 are executed by computing infrastructure of VCE 12C.

Storage devices 24A-24C (collectively, "storage devices 24") may be configured to store information within respective VCEs 12 during operation. Storage devices 24 may include any form of computer-readable storage mediums or computer-readable storage devices. In some examples, storage devices 24 include one or more of a short-term memory or a long-term memory. Storage devices 24 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage devices 24 are used to store program instructions for execution by VCEs 12.

Storage devices 24 may be used by software or applications running on respective VCEs 12 to temporarily store information during program execution. For example, storage devices 24 may be configured to store both primary and backup data representing at least some of the plurality of workloads deployed to VCEs 12. Such data may include executing processes, state information, and/or data associated with, generated by, or used by the group of workloads. In the example of FIG. 1, workloads 21 may be executed by computing infrastructure of VCE 12A, which may include one or more virtual routers, virtual servers, or physical servers.

For example, Storage device 24A may store the data indicative of workloads 19 for both primary processing, and also to enable the migration of at least some of workloads 19 during an event in which at least a portion of VCE 12A goes offline. In a similar manner, Storage device 24B stores data indicative of workloads 21 deployed to VCE 12B and storage device 24C stores data indicative of workloads 23 deployed to VCE 12C. Consequently, during a failure of any one of VCEs 12, at least some workloads may be migrated from the respective offline VCE to at least one operational VCE by migrating executing processes, state information, and/or data stored as either primary and/or backup data stored within each VCE 12. In general, the underlying computing infrastructure enabling such migration, and capabilities for storing redundant and/or backup data indicative of workloads stored by storage devices 24 may be referred to as "replication infrastructure."

As an example, processing circuitry (e.g., physical computing infrastructure of multi-cloud network 10) having access to storage devices 24 is configured to communicate with each of VCEs 12, including a first VCE (e.g., VCE 12B) and a second VCE (e.g., VCE 12A), wherein each of VCEs 12 is operated by a different public cloud provider. In this way, VCEs operated by different public cloud providers may define a hybrid cloud, such as multi-cloud network 10, communicate with each other, and exchange data. Controller 14, executed by the processing circuitry, is configured to deploy workloads 21 to the VCE 12B. A portion of the processing circuitry of multi-cloud network 10 is configured to detect a failure of at least a portion of VCE 12B and output, to VCE 12B and responsive to detecting the failure, an instruction to transfer a set of workloads of workloads 21 to VCE 12A to thereby cause a migration of the set of workloads to VCE 12A. Additionally, the migration of the set of workloads to VCE 12A is performed despite the failure of the portion of VCE 12B by leveraging replication infrastructure provided by VCE 12B. The underlying computing infrastructure and executing processes, state information, and/or data stored within storage device 24B of VCE 12B may be considered replication infrastructure. A controller (e.g., controller 28 or another system or device having access to multi-cloud network 10) may leverage or use such replication infrastructure to perform migrations (e.g. workload migrations) across the multi-cloud network 10, even where a failure of VCE 12B has been detected.

In the example of FIG. 1, heartbeat agents 26A-26C (collectively, "heartbeat agents 26") are configured within VCE 12A, VCE 12B, and VCE 12C, respectively, via the tunnels 17 established by controller 14. Heartbeat agents 26 may be any combination of VMs, containers, Kubernetes pods, or the like. For example, heartbeat agents 26 occupy a relatively small amount of computer memory and require a relatively small amount of computing resources to operate. Each of heartbeat agents 26 transmit a plurality of heartbeat signals, where the plurality of heartbeat signals are transmitted as a series of transmissions, which may be in succession at a periodic rate, a non-periodic rate, intermittently, or otherwise. In one example, heartbeat agent 26A transmits a plurality of heartbeat signals at the periodic rate of one heartbeat signal per second. In other examples, the periodic rate may be greater that one heartbeat signal per second or less than one heartbeat signal per second. In some examples, each heartbeat agent of heartbeat agents 26 may transmit heartbeat signals at a custom periodic rate. In one example, heartbeat agent 26A may transmit a plurality of heartbeat signals at a first custom periodic rate of one heartbeat signal per second, heartbeat agent 26B may transmit heartbeat signals at a second custom periodic rate of two heartbeat signals per second, and heartbeat agent 26C may transmit heartbeat signals at a third custom periodic rate of five heartbeat signals per second. Controller 14 is configured to set and modify the custom periodic rate associated with each of heartbeat agents 26.

The plurality of heartbeat signals transmitted by each heartbeat agent of heartbeat agents 26 may indicate a health status of the respective VCEs 12. Put another way, a heartbeat agent (e.g., heartbeat agent 26A) may transmit a plurality of heartbeat signals, where each heartbeat signal of the plurality of heartbeat signals indicates that the respective VCE (i.e., VCE 12A) is online, or healthy. Since heartbeat agent 26A transmits the plurality of heartbeat signals continuously at the first custom periodic rate, heartbeat agent 26A may provide a near or seemingly near real-time status update of VCE 12A. In an event in which VCE 12A ceases to perform at least some of its tasks, heartbeat agent 26A may cease to transmit the plurality of heartbeat signals at the periodic rate. Such an omission may indicate that VCE 12A is unable to process at least some of workloads 19 and may trigger a migration of the at least some of workloads 19 to other VCEs 12.

Disaster recovery controller 28 is configured to receive a plurality of sequences of heartbeat signals from heartbeat agents 26. Like heartbeat agents 26, disaster recovery controller 28 is a virtual machine created and deployed by controller 14. Although disaster recovery controller 28 is depicted in FIG. 1 as being separate from VCEs 12, disaster recovery controller 28 may be deployed to any of VCEs 12. In other words, disaster recovery controller 28 may be configured to operate within any of VCEs 12, and disaster recovery controller 28 may alternatively be configured to operate in a separate computing system outside of VCEs 12. Example separate computing systems that disaster recovery controller 28 is configured to operate in may include bare metal servers or virtualized execution environment (e.g., containers or virtual machines).

Heartbeat agents 26A-26C transmit heartbeat signals to disaster recovery controller 28 via transmission channel 30A, transmission channel 30B, and transmission channel 30C, respectively. In some examples where disaster recovery controller 28 is deployed to one of VCEs 12, transmission channels 30A-30C (collectively, "transmission channels 30") may carry heartbeat signals through tunnels 17 and connect gateway routers 16. For example, if disaster recovery controller 28 is deployed to VCE 12A, then heartbeat agent 26B is configured to transmit heartbeat signals to disaster recovery controller 28 via transmission channel 30B which passes through connect gateway router 16B, tunnel 17A, and connect gateway router 16A. In other examples where disaster recovery controller 28 is deployed to one of VCEs 12, heartbeat agents 26 may transmit heartbeat signals to disaster recovery controller 28 independently from connect gateway routers 16 and tunnels 17. In other words, transmission channels 30 may connect heartbeat agents 26 and disaster recovery controller 28 without passing through connect gateway routers 16 and tunnels 17. For example, a software program may monitor gateway routers 16 and tunnels 17 within multi-cloud network 10, and heartbeat agents 26 may transmit heartbeat signals to disaster recovery controller 28 via the software program.

Disaster recovery controller 28 is configured to monitor receipt rates in which heartbeat signals are received from each heartbeat agent of heartbeat agents 26. Additionally, disaster recovery controller 28 is configured to store the custom periodic rates in which heartbeat agents 26 transmit heartbeat signals indicating that the respective VCEs 12 are operational, or "online". To determine that a VCE of VCEs 12 (e.g., VCE 12A) is online, disaster recovery controller 28 expects to receive heartbeat signals from heartbeat agents 26 at the first custom periodic rate associated with heartbeat agents 26A. An event in which disaster recovery controller 28 does not receive an expected heartbeat signal may be referred to as a "heartbeat signal omission."

Disaster recovery controller 28 is configured to determine a number of heartbeat signal omissions corresponding to each heartbeat agent of heartbeat agents 26 based on the plurality of sequences of heartbeat signals. In some examples, to determine the number of heartbeat signal omissions associated with a heartbeat agent (e.g., heartbeat agent 26B), disaster recovery controller 28 is configured to calculate a time interval, where the time interval represents an estimated amount of time between consecutive heartbeat signals of the sequence of heartbeat signals emitted by heartbeat agent 26B. The time interval may be calculated based on a periodic rate associated with heartbeat agent 26B, where the periodic rate represents the rate in which heartbeat agent 26B emits heartbeat signals while heartbeat agent 26B is online. Disaster recovery controller 28 is configured to receive a first heartbeat signal of the sequence of heartbeat signals emitted by heartbeat agent 26B and start a time window in response to receiving the first heartbeat signal. Subsequently, disaster recovery controller 28 identifies a number of instances that the time interval lapses during the time window and identifies the number of heartbeat signal omissions based on the number of instances that the time interval lapses during the time window. After disaster recovery controller 28 receives a second heartbeat signal of the sequence of heartbeat signals emitted by heartbeat agent 26B, disaster recovery controller 28 is configured to reset the time window.

For example, if heartbeat agent 26B transmits heartbeat signals at the periodic rate of two heartbeat signals per second when VCE 12B is online, disaster recovery controller 28 identifies six heartbeat signal omissions associated with heartbeat agent 26B if greater than about three seconds passes between consecutive heartbeat signals received by disaster recovery controller 28 from heartbeat agent 26B. By the same token, if disaster recovery controller 28 does not receive any heartbeat signals from heartbeat agent 26A for a period of time lasting greater than about seven seconds, disaster recovery controller 28 identifies fourteen heartbeat signal omissions that can be attributed to heartbeat agent 26B. Disaster recovery controller 28 may identify heartbeat signal omissions in near or seemingly near real-time. In other words, disaster recovery controller 28 is configured to maintain a rolling count of heartbeat signal omissions associated with each heartbeat agent of heartbeat agents 26. Each event in which disaster recovery controller 28 fails to receive an expected heartbeat signal from a heartbeat agent, disaster recovery controller 28 records a heartbeat signal omission associated with the respective heartbeat agent.

Disaster recovery controller 28 is configured to determine that a VCE (e.g., VCE 12B) of VCEs 12 is offline in response to determining that the number of heartbeat signal omissions corresponding to heartbeat agent 26B exceeds a threshold number of heartbeat signal omissions. In some examples, the threshold number of heartbeat signals defines a number of consecutive heartbeat signal omissions (e.g., six consecutive heartbeat signal omissions). For example, if the threshold number of heartbeat signal omissions comprises six consecutive heartbeat signal omissions, then disaster recovery controller 28 determines that VCE 12B is offline if disaster recovery controller 28 detects six consecutive heartbeat signal omissions associated with heartbeat agent 26B. Since heartbeat signal omissions are recorded in near or seemingly near real-time, disaster recovery controller 28 determines that VCE 12B is offline immediately after the sixth consecutive heartbeat signal omission is identified.

In other examples, disaster recovery controller 28 sets the threshold number of heartbeat signal omissions to a threshold number of heartbeat signal omissions within a predetermined number of expected heartbeat signals. For example, if disaster recovery controller 28 expects to receive ten consecutive heartbeat signals from heartbeat agent 26A within a period of time and disaster recovery controller 28 detects five heartbeat signal omissions during the period of time (i.e., disaster recovery controller 28 receives five heartbeat signals of the expected ten consecutive heartbeat signals), then disaster recovery controller 28 may determine that VCE 12A is offline.

After determining that a particular VCE (e.g., VCE 12B) is offline, disaster recovery controller 28 is configured to output an instruction to transfer, in response to determining that VCE 12B is offline, a set of workloads of workloads 21 deployed to VCE 12B to other VCEs (e.g., VCE 12B and VCE 12C) of the plurality of VCEs. As discussed above, storage devices 24 are configured to store data representative of the plurality of workloads deployed to respective VCEs 12. As such, after disaster recovery controller 28 determines that VCE 12B is offline, disaster recovery controller 28 outputs an instruction to controller 14 to transfer a set of workloads of workloads 21 deployed to VCE 12B to any combination of VCEs 12A and 12C. The transferal of the set of workloads is performed despite the failure of the portion of VCE 12B by leveraging replication infrastructure provided by the VCE 12B. For example, replication infrastructure for VCE 12B may store data, representing and/or replicating the set of workloads, in storage device 24B and the replication infrastructure may be used to transmit that data to other VCEs.

Put another way, during an "offline" state, virtual router 20 of VCE 12B may become inoperable (e.g., unable to execute at least some of workloads 21). However, VCE 12B may still be capable of transferring data from storage device 24B to VCE 12A and VCE 12C, using, for example, redundant and/or geographically diverse data centers that contain replicated data corresponding to the deployed workloads. In such an example, storage device 24B may represent a geographically-distributed data storage system spanning multiple data centers. VCEs 12A-12C are each operated by a different cloud service provider. As such, in response to receiving the instruction from disaster recovery controller 28 that VCE 12B is offline, controller 14 may direct VCE 12B to transfer data representing a replication of at least some of workloads 21 deployed to VCE 12B, which may be stored as part of replication infrastructure of VCE 12B, to a virtual cloud environment that is operated by a different provider. Consequently, in response to such direction, VCE 12B may transfer the data to any combination of VCE 12A and VCE 12C.

After VCE 12B fails, in some examples, not every workload of workloads 21 deployed to VCE 12B is necessarily transferred to other VCEs. Each VCE may independently determine which workloads to transfer in the event of a system failure. For example, VCE 12B may identify a set of workloads of workloads 21 as "essential." After the essential workloads are transferred, they may be executed by other VCEs (i.e., VCE 12A and VCE 12C).

In some examples, the cloud service providers of VCEs 12 maintain subscription services including greater than one class of service. For example, VCE 12B may handle workloads associated with customers who subscribe to a high-quality class of service and additionally handle workloads associated with customers who subscribe to a low-quality class of service. After VCE 12B goes offline, it may transfer the workloads associated with the high-quality class of service to operational VCEs (i.e., VCE 12A and VCE 12C). As such, the workloads associated with the high-quality class of service are executed by VCE 12A and VCE 12C and the workloads associated with the low-quality class of service are not, in some examples, executed until VCE 12B comes back online.

Offline VCEs may, in some examples, transfer workloads to operational VCEs through connect gateway routers 16 and tunnels 17. In other examples, VCEs may exchange workloads via separate communication links independent of connect gateway routers 16 and tunnels 17.

Although FIG. 1 illustrates three VCEs (i.e., VCE 12A, VCE 12B and VCE 12C) as being a part of multi-cloud network 10, in other examples not shown in FIG. 1, multi-cloud network 10 may include less than three VCEs or greater than three VCEs.

Figure 2:
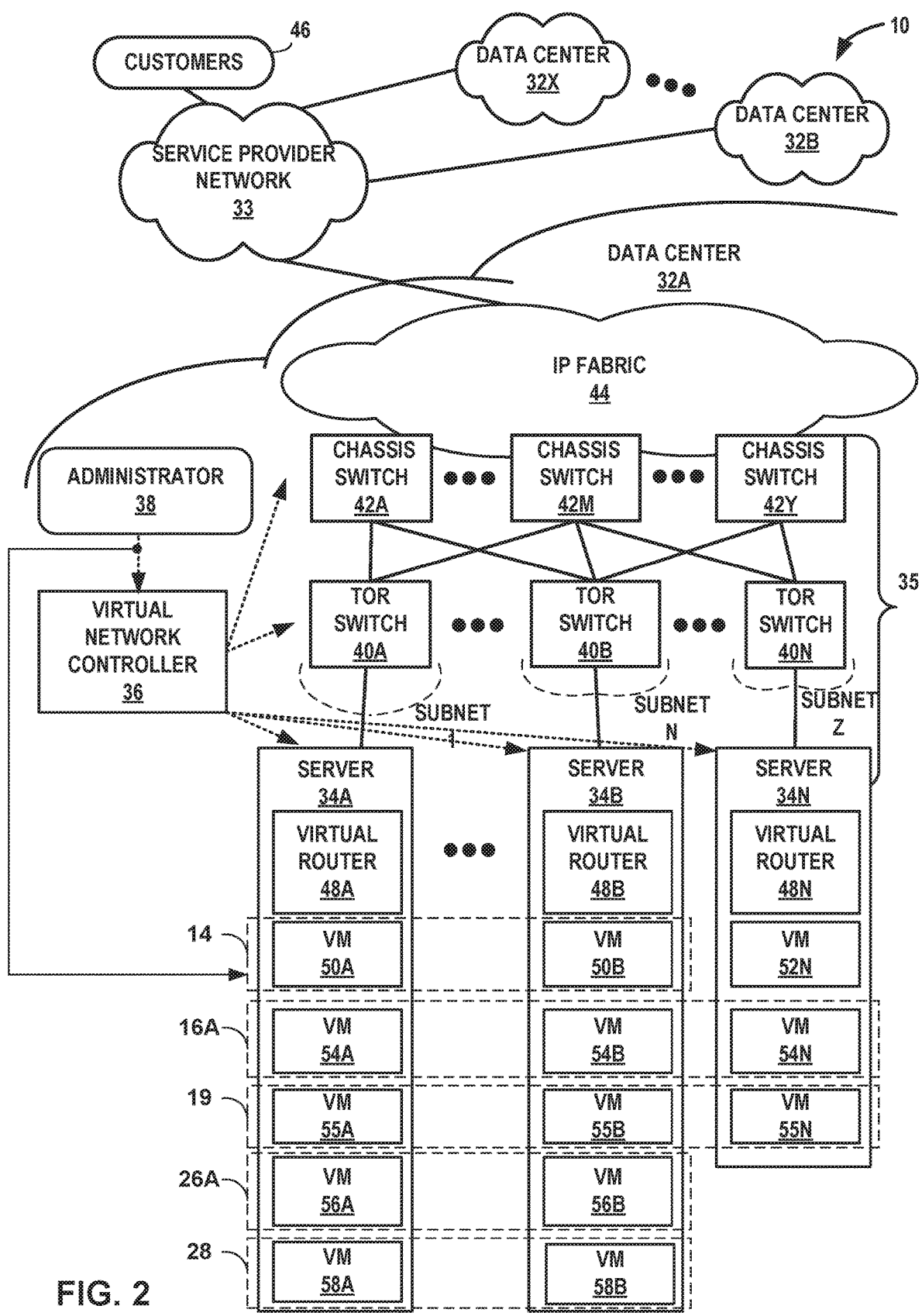
FIG. 2 is a block diagram illustrating an example multi-cloud network having a data center in which examples of techniques described herein may be implemented.

FIG. 2 is a block diagram illustrating an example multi-cloud network having a data center in which examples of techniques described herein may be implemented. FIG. 2 illustrates data centers 32A-32X, which house servers that form respective ones of VCEs 12. As one example, data center 32A houses servers 34A-34N that may be configured to provide the infrastructure for VCE 12A. The other data centers 32 may be substantially similar to data center 32A but may house servers for other VCEs 12. Also, one or more of data centers 32 may house servers for multiple VCEs 12.

As illustrated, data centers 32A-32X (collectively, "data centers 32") are interconnected with one another and with customer networks associated with customers 46 via a service provider network 33. In general, each data center 32A provides an operating environment for applications and services for customers 46 coupled to the data center by service provider network 33. Data centers 32 may, for example, host infrastructure equipment, such as networking and storage systems, redundant power supplies, and environmental controls. Service provider network 33 may be coupled to one or more networks administered by other providers and may thus form part of a large-scale public network infrastructure, e.g., the Internet.

In some examples, each of data centers 32 may represent one of many geographically distributed network data centers. As illustrated in the example of FIG. 2, each of data centers 32 may represent a facility that provides network services for customers 46. Customers 46 may be collective categories such as enterprises and governments or individuals. For example, a network data center may host a virtual computing environment (e.g., cloud) that provides web services for several enterprises and end users. Other exemplary services may include data storage, virtual private networks, traffic engineering, file service, data mining, scientific- or super-computing, and so on. In some examples, each of data centers 32 may be individual network servers, network peers, or otherwise.

In the illustrated example, each of data centers 32 includes a set of storage systems and application servers 34A-34N (herein, "servers 34") interconnected via high-speed switch fabric 35 provided by one or more tiers of physical network switches and routers. Switch fabric 35 is provided by a set of interconnected top-of-rack (TOR) switches 40A-40N (collectively, "TOR switches 40") coupled to a distribution layer of chassis switches 42A-42Y (collectively, "chassis switches 42"). Although not shown, each of data centers 32 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 40 and chassis switches 42 provide servers 34 with redundant (multi-homed) connectivity to IP fabric 44 and service provider network 33. Chassis switches 42 aggregate traffic flows and provides high-speed connectivity between TOR switches 40. TOR switches 40 may be network devices that provide layer two (e.g., MAC) and/or layer 3 (e.g., IP) routing and/or switching functionality. TOR switches 40 and chassis switches 42 may each include one or more processors and a memory, and that are capable of executing one or more software processes. Chassis switches 42 are coupled to IP fabric 44, which performs layer 3 routing to route network traffic between data centers 32 and customers 46 by service provider network 33.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 48A-48N (collectively, "virtual routers 48") of servers 34 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 48 needs to contain all IP prefixes or all MAC addresses for all virtual machines in the entire data center. A given virtual router 48 only needs to contain those routing instances that are locally present on the server 34 (i.e. which have at least one virtual machine present on the server 34.)

One or more of servers 34 may each include a virtual router 48 that executes one or more routing instances for corresponding virtual networks within data center 32A to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 48A of server 34A, for instance, from the underlying physical network fabric of data center 32A (i.e., IP fabric 44 and switch fabric 35) may include an outer header to allow the physical network fabric to tunnel the payload or "inner packet" to a physical network address for a network interface card (not pictured) of server 34A that executes the virtual router. The outer header may include not only the physical network address of the network interface card of the server but also a virtual network identifier such as a VxLAN tag or Multiprotocol Label Switching (MPLS) label that identifies one of the virtual networks as well as the corresponding routing instance executed by the virtual router 48A. An inner packet includes an inner header having a destination network address that conforms to the virtual network addressing space for the virtual network identified by the virtual network identifier.

Virtual routers 48 terminate virtual network overlay tunnels and determine virtual networks for received packets based on tunnel encapsulation headers for the packets, and forwards packets to the appropriate destination virtual network endpoints for the packets. For server 34A, for example, for each of the packets outbound from virtual network endpoints hosted by server 34A (e.g., VM 58A), the virtual router 34A attaches a tunnel encapsulation header indicating the virtual network for the packet to generate an encapsulated or "tunnel" packet, and virtual router 34A outputs the encapsulated packet via overlay tunnels for the virtual networks to a physical destination computing device, such as another one of servers 34. As used herein, a virtual router 48 may execute the operations of a tunnel endpoint to encapsulate inner packets sourced by virtual network endpoints to generate tunnel packets and decapsulate tunnel packets to obtain inner packets for routing to other virtual network endpoints.

In the example illustrated in FIG. 2, data center 32A is configured to provide the infrastructure for VCE 12A. For example, servers 34A-34N may be configured to execute virtualized machines (VMs) and/or containers (e.g., using Kubernetes pods) to support the operation of VCE 12A. Moreover, in the example of FIG. 1, controller 14 is part of VCE 12A. Accordingly, servers 34A-34N may be configured to support the operation of controller 14.

As illustrated in FIG. 2, servers 34A and 34B execute VMs 50A and 50B. In this example, VMs 50A and 50B together provide a virtualized machine on which controller 14 can execute and perform the example operations of controller 14 described in this disclosure (e.g., provide a centralized controller to ensure proper route propagation, securing, and application deployment on the VCEs with a single pane of glass interface). Servers 34A, 34B, and 34N execute VMs 54A, 54B, and 54N. In this example, VMs 54A, 54B, and 54N together provide a virtualized machine on which connect gateway router 16A executes and performs the example operations of connect gateway router 16A described in this disclosure (e.g., form a logical endpoint within a logical tunnel mesh for VCE 12A). In the example of FIG. 2, VMs 55A, 55B, and 55N (collectively, "VMs 55") support applications and services associated with at least one of customers 46. Tasks (i.e., "work") performed by VMs 55 represent the workloads 19 that are deployed to VCE 12A.

Server 34N is also illustrated as executing VM 52N. VM 52N may provide a virtualized machine on which applications that are to execute within VCE 12A execute. For example, VCE 12A may provide computation resources to offload computationally complex tasks from a personal computer. In some examples, VM 52N is the platform on which the applications execute to perform the tasks offloaded from the personal computer.

Additionally, servers 34A and 34B execute VM 56A and VM 56B which collectively define a virtualized machine on which heartbeat agent 26A can execute and perform the example operations of heartbeat agent 26A described in this disclosure. For example, heartbeat agent 26A may transmit a sequence of heartbeat signals to disaster recovery controller 28 to indicate that the VCE 12A is online. Moreover, additional servers (not pictured) of any combination of data centers 32B-32X may execute additional VMs or containers (not pictured) which collectively define heartbeat agent 26B and heartbeat agent 26C. Although heartbeat agent 26A is illustrated as being executed by two servers (i.e., servers 34A and 34B), in some examples not shown in FIG. 2, heartbeat agent 26A is executed by less than two of servers 34 or greater than of two servers 34.

In the example of FIG. 2, disaster recovery controller 28 is executed by data center 32A. More specifically, servers 34A and 34B host VMs 58A and 58B, respectively, which collectively provide a virtualized machine on which disaster recovery controller 28 operates. Put another way, in the example of FIG. 2, two servers (i.e., servers 34A and 34B) provide the physical computing infrastructure to support disaster recovery controller 28. In other examples not pictured in FIG. 2, less than two of servers 34 or greater than two of servers 34 may execute virtual machines for performing the operations of disaster recovery controller 28. Furthermore, in other examples not pictured in FIG. 2, one or more servers of any combination of data centers 32A-32X may execute virtual machines which collectively provide the virtualized machine on which disaster recovery controller operates. In other words, disaster recovery controller 28 may operate within any one of data centers 32A-32X or operate across any combination of data centers 32A-32X.

VMs 50A, 50B, 52N, 54A, 54B, 54N, 55A, 55B, 55N, 56A, 56B, 58A, and 58B are illustrated merely to assist with understanding and should not be considered as limiting. For example, virtual network controller 36 ("VNC") may be configured to spin up and spin down virtual machines across or within servers 34 as needed to support the operations of VCE 12A, controller 14, connect gateway router 16A, workloads 19, heartbeat agent 26A, and disaster recovery controller 28. However, the example techniques are not so limited, and in some examples, controller 14 may be configured to determine resources within data center 32A that are to be utilized (e.g., how many VMs are spun up or spun down) for VCE 12A. Moreover, in some examples, controller 14 may be configured to determine resources within the other data centers 32 that are to be utilized (e.g., how many VMs are spun up or spun down) for the other VCEs 12.

In addition to being configured to determine resources within data centers 32A, controller 14 is further able to configure disaster recovery controller 28 in any one of VCEs 12 or any combination of VCEs 12. Moreover, controller 14 is able to configure heartbeat agents 26 in VCEs 12, where the virtual network controller configures a heartbeat agent of heartbeat agents 26 in each VCE of VCEs 12. For example, controller 14 may configure heartbeat agent 26A in VCE 12A, controller 14 may configure heartbeat agent 26B in VCE 12B, and controller 14 may configure heartbeat agent 26C in VCE 12C.

In general, virtual network controller 36 controls the network configuration of the multi-cloud network 10 fabric to, e.g., establish one or more virtual networks for packetized communications among virtual network endpoints. Virtual network controller 36 provides a logically and in some cases physically centralized controller for facilitating operation of one or more virtual networks within each of data centers 32, such as data center 32A. In some examples, virtual network controller 36 may operate in response to configuration input received from network administrator 38. Moreover, as illustrated in this example, administrator 38 may be tasked with providing configuration information for controller 14 so that controller 14 can perform the example operations described in this disclosure. Administrator 38 may represent an operator, developer, or application deployment specialist that uses a common interface to create and deploy virtual computing environment topologies to virtual network controller 36 and controller 14 for provisioning within the computing infrastructure. Additional information regarding virtual network controller 36 operating in conjunction with other devices of data center 32A or other software-defined network may be found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein.

In some examples, the traffic between any two network devices, such as between network devices within IP fabric 44 (not shown), between servers 34, and customers 46, or between servers 34, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

The flow within data center 32A is one example of a flow. Another example of a flow is the flow of data between VCEs 12. As described above, examples of flow between VCEs 12 include UDP encapsulated ESP packets. In some examples, virtual network controller 36 configures TOR switches 40 and chassis switches 42 to create virtual networks within data center 32A. Additionally, virtual network controller 36 may create virtual networks within or between any of data centers 32.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow ma y be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

Accordingly, FIG. 2 illustrates an example of a VCE 12A in a multi-cloud network 10. For example, in FIG. 2, a single SDN controller 14 is configured to establish the logical tunnel mesh to interconnect the plurality of VCEs 12 in the multi-cloud network via respective connect gateway routers 16. SDN controller 14 is also configured to advertise the one or more logical tunnels to VCEs 12. As illustrated in FIG. 2, data center 32A includes one or more virtual machines executing on one or more servers, such that the one or more virtual machines form an infrastructure for VCE 12A, and at least one of the virtual machines executes a connect gateway router 16A to form the logical endpoint for VCE 12A. For example, in FIG. 2, VMs 50A and 50B on servers 34A and 34B, respectively, form an infrastructure for controller 14, VM 52N forms on server 34N to form an infrastructure for VCE 12A, and VMs 54A-54N on servers 34A-34N, respectively, form an infrastructure for connect gateway router 16A.

Although FIG. 2 illustrates one example of data center 32A, other data centers may be substantially similar, but might not execute an instance of controller 14. For example, a set of one or more virtual machines executing on second set of one or more servers in data centers 32A-32N may form an infrastructure for VCE 12B. Also, at least one of the set of one or more virtual machines executes connect gateway router 16B to form the logical endpoint for VCE 12B. In this example, controller 14 is configured to establish a logical tunnel (e.g., tunnel 17A) of the logical tunnel mesh that interconnects the connect gateway router 16A and connect gateway router 16B.

Figure 3:
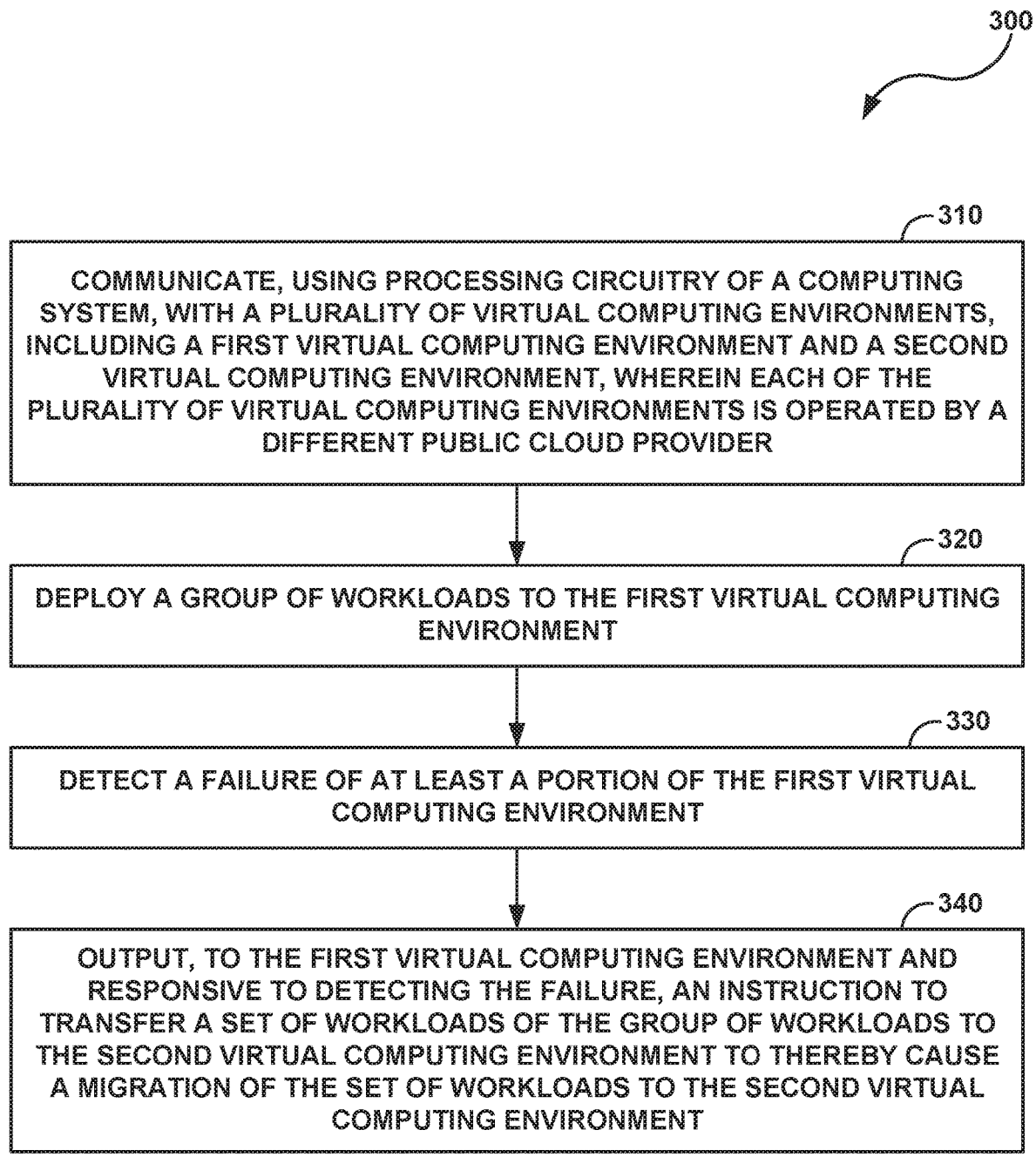
FIG. 3 is a flow diagram illustrating an example operation of migrating workloads between virtual computing environments, in accordance with one or more example techniques described in this disclosure.

FIG. 3 is a flow diagram illustrating an example operation 300 of migrating workloads between virtual computing environments (e.g., VCEs 12 of FIG. 1), in accordance with one or more example techniques described in this disclosure. Example operation 300 is described with respect to multi-cloud network 10 of FIG. 1.

According to example operation 300, processing circuitry (e.g., processing circuitry configured to execute controller 14) is configured to communicate with VCEs 12, including a first virtual computing environment (e.g., VCE 12B) and a second virtual computing environment (e.g., VCE 12A), where each of VCEs 12 is operated by a different public cloud provider (310). In one example, the processing circuitry configured to execute controller 14 is positioned within VCE 12A. However, in other examples, the processing circuitry is located in any one of or any combination of VCEs 12. As such, the processing circuitry may be configured to distribute and receive data throughout multi-cloud network 10. In some examples, at least one of VCEs 12 comprises a virtual private cloud (VPC). The public cloud operators which operate VCEs 12 may include at least one of Amazon Web Services (AWS), Google Cloud Platform (GCP), and Microsoft Azure, or the like. Although each cloud provider may operate a plurality of clouds, each VCE of VCEs 12 is operated by a separate cloud service provider. Put another way, a particular VCE (e.g., VCE 12B) may include more than one cloud operated by a single public cloud provider (e.g., AWS), however two separate VCEs (e.g., VCE 12B and VCE 12C) are operated by two separate cloud providers, such as AWS and GCP, respectively.

The processing circuitry is configured to deploy a group of workloads (e.g., workloads 21) to the first virtual computing environment (e.g., VCE 12B) (320). In general, the term "workload" refers to work performed by any combination of applications, services, VMs, pods, containers, data, metadata, state information, or the like, which may be executed by VCE 12B. Workloads 21 may correspond to one or more customers of the cloud service provider which operates VCE 12B. Furthermore, disaster recovery controller 28 may detect a failure of at least a portion of VCE 12B (330).

In response to detecting the failure of VCE 12B, disaster recovery controller 28 is configured to output, to VCE 12B and responsive to detecting the failure, an instruction to transfer a set of workloads of workloads 21 to VCE 12A to thereby cause a migration of the set of workloads to VCE 12A (340). In some examples, the migration of the set of workloads to VCE 12A is performed despite the failure of the portion of VCE 12B by leveraging replication infrastructure provided by VCE 12B, wherein the replication infrastructure includes storage device 24B and data stored in storage device 24B.

Figure 4:
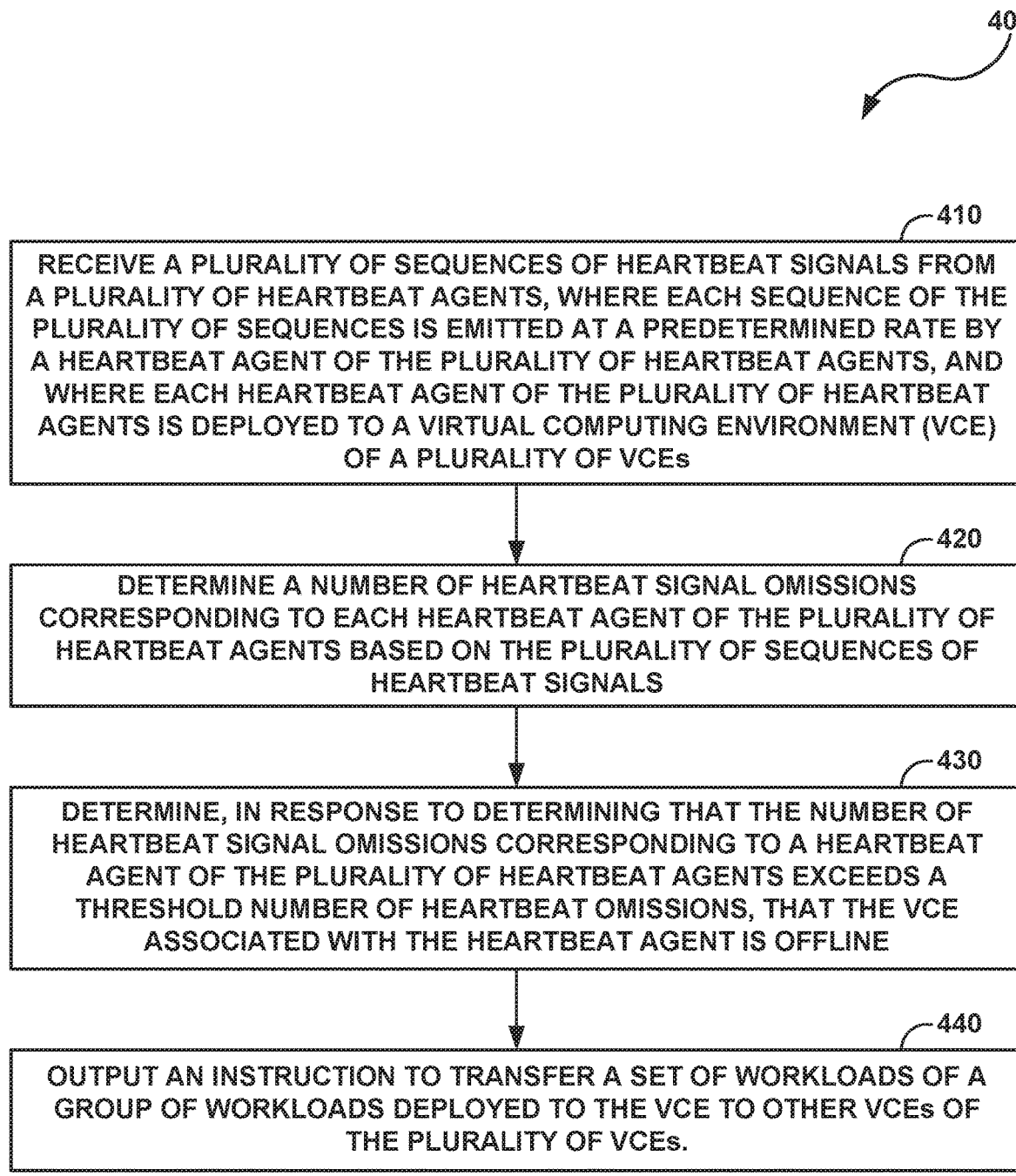
FIG. 4 is a flow diagram illustrating an example operation of a disaster recovery controller, in accordance with one or more example techniques described in this disclosure.

FIG. 4 is a flow diagram illustrating an example operation 400 of a disaster recovery controller, such as disaster recovery controller 28 of FIG. 1, in accordance with one or more example techniques described in this disclosure. Example operation 400 is described with respect to multi-cloud network 10 of FIG. 1.

According to example operation 400, disaster recovery controller 28 is configured to receive a plurality of sequences of heartbeat signals from heartbeat agents 26, where each sequence of the plurality of sequences is emitted at a periodic rate by a heartbeat agent of heartbeat agents 26, and where each heartbeat agent of heartbeat agents 26 is deployed to a VCE of VCEs 12 (410). Heartbeat agents 26 may define virtual machines (VMs) that are created by controller 14 and deployed to VCEs 12. At least some of heartbeat agents 26 (e.g., heartbeat agent 26B and heartbeat agent 26C) may be deployed to VCEs 12 via connect gateway routers 16 and tunnels 17. In some examples, each sequence of heartbeat signals of the plurality of heartbeat signals define a regular or irregular stream of "pings" indicating that the respective VCE is online and operational. For example, heartbeat agent 26A may emit a first sequence of heartbeat signals at a first periodic rate, heartbeat agent 26B may emit a second sequence of heartbeat signals at a second periodic rate, and heartbeat agent 26C may emit a third sequence of heartbeat signals at a third periodic rate. Heartbeat agents 26 emit heartbeat signals if the respective VCE is online.

Disaster recovery controller 28 is configured to determine a number of heartbeat signal omissions corresponding to each heartbeat agent of heartbeat agents 26 based on the plurality of sequences of heartbeat signals (420). Disaster recovery controller 28 is further configured to store the first periodic rate, the second periodic rate, and the third periodic rate associated with heartbeat agent 26A, heartbeat agent 26B, and heartbeat agent 26C, respectively. Based on the periodic rates, disaster recovery controller 28 may determine times in which heartbeat signals are "expected" to indicate that the respective VCEs 12 are online. If disaster recovery controller 28 does not receive a heartbeat signal at an expected time, disaster recovery controller 28 may determine that a heartbeat signal omission has occurred. Since heartbeat agents 26 emit heartbeat signals when the respective VCEs 12 are online, heartbeat signal omissions may be indicative of VCE failure. As such, disaster recovery controller 28 evaluates if a particular VCE has failed based on a number of heartbeat signal omissions associated with the particular VCE.

Example operation 400 further includes using disaster recovery controller 28 to determine, in response to determining that the number of heartbeat signal omissions corresponding to a heartbeat agent of heartbeat agents 26 exceeds a threshold number of heartbeat signal omissions, that the VCE associated with the heartbeat agent is offline (430). In some examples, disaster recovery controller 28 sets the threshold number of heartbeat signal omissions a threshold number of consecutive heartbeat signal omissions (e.g., three consecutive heartbeat signal omissions), and disaster recovery controller 28 determines that the VCE associated with the heartbeat agent is offline after the threshold number of consecutive heartbeat signal omissions is reached. In other examples, disaster recovery controller 28 sets the threshold number of heartbeat signal omissions to a threshold number of heartbeat signal omissions within a predetermined number of expected heartbeat signals. For example, if disaster recovery controller 28 expects to receive ten consecutive heartbeat signals from heartbeat agent 26A within a period of time and disaster recovery controller 28 detects five heartbeat signal omissions during the period of time (i.e., disaster recovery controller 28 receives five heartbeat signals of the expected ten consecutive heartbeat signals), then disaster recovery controller 28 may determine that VCE 12A is offline.

After determining that the VCE is offline, disaster recovery controller 28 is configured to output an instruction to transfer a set of workloads of a group of workloads deployed to the VCE to other VCEs of VCEs 12 (440). Each of VCEs 12 include a storage device 24 configured to store data representing a group of workloads deployed to the respective VCE and a connect gateway router 16 forming a logical endpoint within a logical tunnel mesh. In other words the logical tunnel mesh is formed using the connect gateway router 16 of each of VCEs 12 as logical endpoints. In some examples, outputting the instruction to transfer the set of workloads from a VCE (e.g., VCE 12A) to other VCEs (e.g., VCE 12B and VCE 12C) of VCEs 12 includes outputting an instruction to transfer, via the logical tunnel mesh and the connect gateway router, at least some of the data stored in the storage device to the other VCEs of the plurality of VCEs, where the at least some of the data represents the set of workloads.

After VCE 12A fails, in some examples, not every workload of workloads 19 deployed to VCE 12A is transferred to other VCEs. Each VCE may independently determine which workloads to transfer in the event of a system failure. For example, VCE 12A may identify a set of workloads of the group of workloads as "essential." After the essential workloads are transferred, they may be executed by other VCEs (i.e., VCE 12B and VCE 12C). In some examples, VCEs 12 maintain subscription services including greater than one class of service. For example, VCE 12B may handle workloads associated with customers who subscribe to a high-quality class of service and additionally handle workloads associated with customers who subscribe to a low-quality class of service. After VCE 12B goes offline, it may transfer the workloads associated with the high-quality class of service to other VCEs (i.e., VCE 12A and VCE 12C). As such, the workloads associated with the high-quality class of service are executed by VCE 12A and VCE 12C and the workloads associated with the low-quality class of service might not be executed until VCE 12B comes back online.

Figure 5:
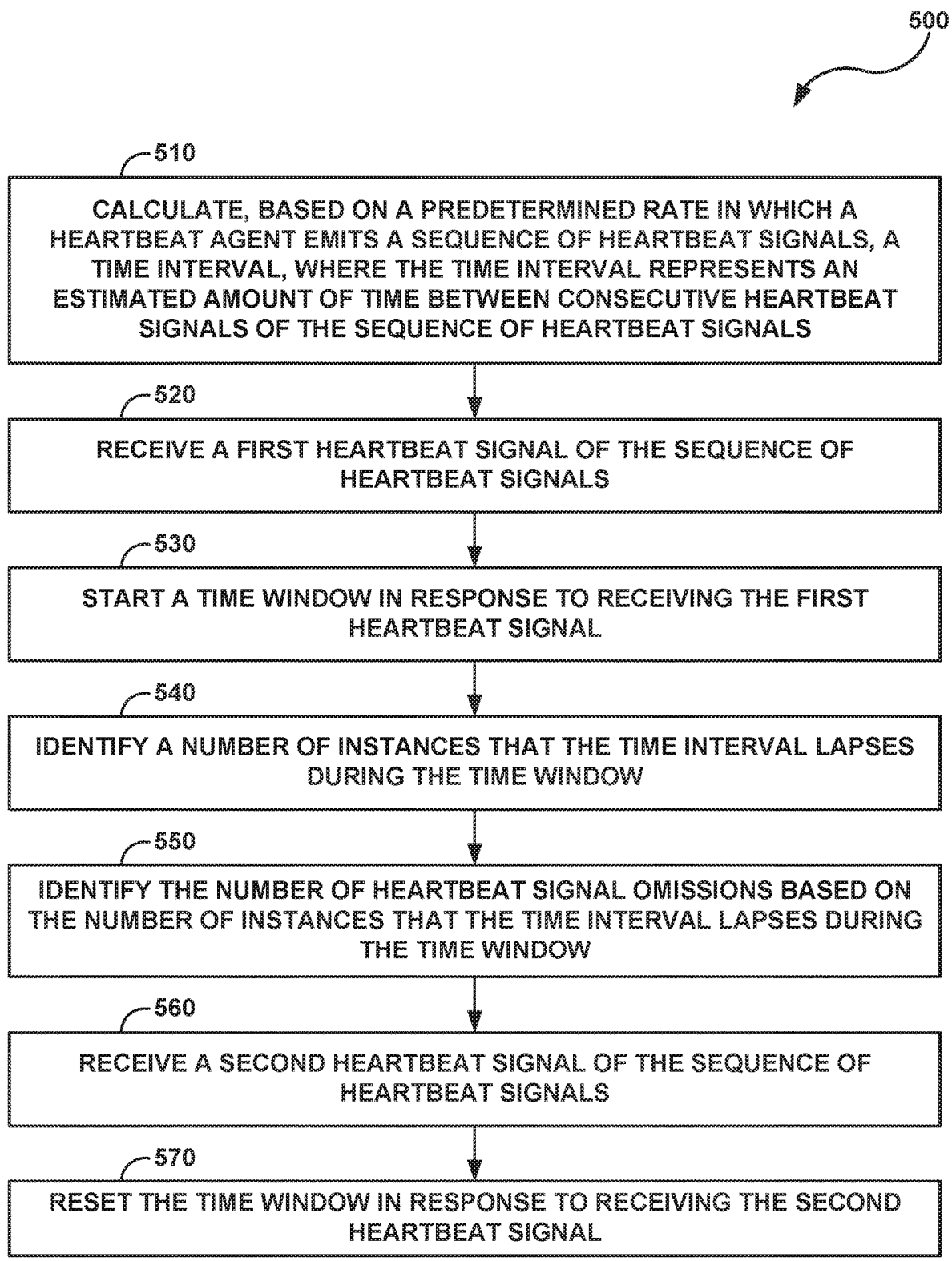
FIG. 5 is a flow diagram illustrating an example operation of using a disaster recovery controller to detect heartbeat signal omissions associated with a plurality of heartbeat agents, in accordance with one or more example techniques described in this disclosure.

FIG. 5 is a flow diagram illustrating an example operation 500 of using disaster recovery controller 28 to detect heartbeat signal omissions associated with heartbeat agents 26, in accordance with one or more example techniques described in this disclosure. Example operation 500 is described with respect to multi-cloud network 10 of FIG. 1. Example operation 500 includes example steps for completing step 420 of example operation 400 of FIG. 4.

According to example operation 500, disaster recovery controller 28 is configured to calculate, based on a periodic rate in which a heartbeat agent (e.g., heartbeat agent 26B) of heartbeat agents 26 emits a sequence of heartbeat signals, a time interval, where the time interval represents an estimated amount of time between consecutive heartbeat signals of the sequence of heartbeat signals (510). Each heartbeat agent of heartbeat agents 26 emits heartbeat signals at a custom periodic rate. As an example, heartbeat agent 26A is configured to emit heartbeat signals at a first custom periodic rate, heartbeat agent 26B emits heartbeat signals at a second custom periodic rate, and heartbeat agent 26C is configured to emit heartbeat signals at a third custom periodic rate. In some examples, the first custom periodic rate, the second custom periodic rate, and the third custom periodic rate are equivalent. In other examples, the custom periodic rates associated with each heartbeat agent 26 define at least two differing values.

Controller 14 is configured to create heartbeat agents 26 and deploy heartbeat agents 26 to VCEs 12. As such, controller 14 is configured to set the custom periodic rate that each heartbeat agent 26 emits heartbeat signals. After creating and deploying heartbeat agents 26, controller 14 transmits data indicative of the first custom periodic rate, the second custom periodic rate, and the third custom periodic rate to disaster recovery controller 28. Disaster recovery controller 28 may calculate the time interval by calculating the inverse of the respective custom periodic rate. For example, if the custom periodic rate associated with heartbeat agent 26B is two heartbeat signal emissions per second, disaster recovery controller 28 calculates the time interval to be 0.5 seconds between consecutive heartbeat signal emissions. The time interval gives an "expected" amount of time between heartbeat signals emitted by heartbeat agent 26B. However, in cases where VCE 12B is offline, disaster recovery controller 28 ceases to receive heartbeat signals from heartbeat agent 26B. Put another way, if the expected amount of time separating heartbeat signals lapses and disaster recovery controller 28 does not receive a heartbeat signal, disaster recovery controller 28 may attribute the failure to receive the heartbeat signal to a heartbeat signal omission related to a possible failure of VCE 12B.

Disaster recovery controller 28 is configured to receive a first heartbeat signal of the sequence of heartbeat signals from heartbeat agent 26B (520). In response to receiving the first heartbeat signal, disaster recovery controller 28 is configured to start a time window (530). In some examples, the time window is open-ended. In other words, after disaster recovery controller 28 starts the time window, the time window will continue until disaster recovery controller 28 stops or resets the time window. As such, the time window functions to record an amount of time that passes after the receipt of the first heartbeat signal by disaster recovery controller 28.

Since the time interval is a constant value, and the time window functions as an increasing clock signal, disaster recovery controller 28 is configured to identify a number of instances that the time interval lapses during the time window (540). For example, if the time interval defines a value of 0.5 seconds between heartbeat signal omissions from heartbeat agent 26B, disaster recovery controller 28 identifies an instance each 0.5 seconds after the time window starts (e.g., after the time window runs for 3.1 seconds, disaster recovery controller 28 has identified six lapses of the time interval). Disaster recovery controller 28 is configured to identify the number of heartbeat signal omissions based on the number of instances that the time interval lapses during the time window (550). Consequently, if disaster recovery controller 28 does not receive heartbeat signals from heartbeat agent 26B at the second custom periodic rate, disaster recovery controller 28 will identify that heartbeat signal omissions are occurring. More specifically, disaster recovery controller 28 is configured to determine an exact number of heartbeat signal omissions based on the length of the time window and the length of the time interval.

Disaster recovery controller 28 is configured to receive a second heartbeat signal of the sequence of heartbeat signals from heartbeat agent 26B (560). In response to receiving the second heartbeat signal, disaster recovery controller 28 is configured to reset the time window (570). In this way, example operation 500 may restart at step 510, with disaster recovery controller 28 determining a number of heartbeat signal omissions that occur after the receipt of the second heartbeat signal.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising:
   a storage medium; and
   processing circuitry having access to the storage medium and configured to:
   communicate with a plurality of virtual computing environments (VCEs), including a first VCE and a second VCE, wherein each of the plurality of VCEs represents at least a portion of a public cloud operated by a different public cloud provider,
   deploy a group of workloads to the first VCE,
   detect a failure of at least a portion of the first VCE in response to determining that a number of heartbeat signal omissions corresponding to the first VCE exceeds a threshold number of heartbeat signal omissions, and
   output, to the first VCE and responsive to detecting the failure, an instruction to transfer a set of workloads of the group of workloads to the second VCE to thereby cause a migration of the set of workloads to the second VCE.

2. A computing system of claim 1, wherein the migration of the set of workloads to the second VCE is performed despite the failure of the first VCE by leveraging replication infrastructure provided by the first VCE.

3. The computing system of claim 1, wherein to detect the failure of at least a portion of the first VCE, the processing circuitry is further configured to:
   receive a sequence of heartbeat signals from a heartbeat agent, wherein the sequence of heartbeat signals is emitted at a rate by the heartbeat agent, and wherein the heartbeat agent is deployed within the first VCE;
   based on the sequence of heartbeat signals, determine the number of heartbeat signal omissions corresponding to the heartbeat agent deployed within the first VCE; and
   in response to determining that the number of heartbeat signal omissions corresponding to the heartbeat agent deployed within the first VCE exceeds the threshold number of heartbeat signal omissions, determine that the first VCE is offline.

4. The computing system of claim 3, wherein the rate is a periodic rate, and wherein to determine the number of heartbeat signal omissions, the processing circuitry is further configured to:
   calculate, based on the periodic rate associated with the heartbeat agent, a time interval, wherein the time interval represents an estimated amount of time between consecutive heartbeat signals of the sequence of heartbeat signals;
   receive a first heartbeat signal of the sequence of heartbeat signals;
   start a time window in response to receiving the first heartbeat signal;
   identify a number of instances that the time interval lapses during the time window;
   identify the number of heartbeat signal omissions based on the number of instances that the time interval lapses during the time window;
   receive a second heartbeat signal of the sequence of heartbeat signals; and
   reset the time window in response to receiving the second heartbeat signal.

5. The computing system of claim 3, wherein the computing system further comprises the plurality of VCEs, and wherein the first VCE comprises:
   a storage device configured to store data representing the group of workloads deployed to the first VCE; and
   a connect gateway router, wherein the connect gateway router forms a logical endpoint within a logical tunnel mesh for the plurality of VCEs.

6. The computing system of claim 5, wherein the processing circuitry is further configured to:
   receive the instruction to transfer the set of workloads; and
   transfer, via the logical tunnel mesh and the connect gateway router, at least some of the data stored in the storage device of the first VCE to the second VCE.

7. The computing system of claim 5, wherein the processing circuitry is further configured to receive at least some of the plurality of sequences of heartbeat signals from the heartbeat agent via the logical tunnel mesh.

8. The computing system of claim 1, wherein the processing circuitry is further configured to execute a multicloud controller configured to:
configure a disaster recovery controller within the plurality of VCEs, wherein the disaster recovery controller is configured to:
detect the failure; and
output the instruction to transfer the set of workloads, wherein the processing circuitry is configured to execute the disaster recovery controller; and
configure a plurality of heartbeat agents in the plurality of VCEs, wherein the multicloud controller configures a heartbeat agent of the plurality of heartbeat agents in each respective VCE of the plurality of VCEs.

9. The computing system of claim 8, wherein a VCE of the plurality of VCEs defines a data center, and the disaster recovery controller is configured within the data center.

10. The computing system of claim 8, wherein the plurality of heartbeat agents executes as at least one of a virtual machine (VM), pod, and container.

11. The computing system of claim 1, wherein at least one VCE of the plurality of VCEs comprises a virtual private cloud (VPC).

12. A method comprising:
communicating, by processing circuitry, with a plurality of virtual computing environments (VCEs), including a first VCE and a second VCE, wherein each of the plurality of VCEs represents at least a portion of a public cloud operated by a different public cloud provider,
deploying a group of workloads to the first VCE,
detecting a failure of at least a portion of the first VCE in response to determining that a number of heartbeat signal omissions corresponding to the first VCE exceeds a threshold number of heartbeat signal omissions, and
outputting, to the first VCE and responsive to detecting the failure, an instruction to transfer a set of workloads of the group of workloads to the second VCE, thereby causing a migration of the set of workloads to the second VCE.

13. The method of claim 12, wherein the migration of the set of workloads to the second VCE is performed despite the failure of the portion of the first VCE by leveraging replication infrastructure provided by the first VCE, and wherein the replication infrastructure is stored in a storage device associated with the first VCE.

14. The method of claim 12, wherein detecting the failure to at least a portion of the first virtual computing environment comprises:
receiving a sequence of heartbeat signals from a heartbeat agent, wherein the sequence of heartbeat signals is emitted at a periodic rate by the heartbeat agent, and wherein the heartbeat agent is deployed within the first VCE;
based on the sequence of heartbeat signals, determining the number of heartbeat signal omissions corresponding to the heartbeat agent deployed within the first VCE; and in response to determining that the number of heartbeat signal omissions corresponding to the heartbeat agent deployed within the first VCE exceeds the threshold number of heartbeat signal omissions, determining that the first VCE is offline.

15. The method of claim 14, wherein determining the number of heartbeat signal omissions comprises:
calculating, based on the periodic rate associated with the heartbeat agent, a time interval, wherein the time interval represents an estimated amount of time between consecutive heartbeat signals of the sequence of heartbeat signals;
receiving a first heartbeat signal of the sequence of heartbeat signals;
starting a time window in response to receiving the first heartbeat signal;
identifying a number of instances that the time interval lapses during the time window
identifying the number of heartbeat signal omissions based on the number of instances that the time interval lapses during the time window;
receiving a second heartbeat signal of the sequence of heartbeat signals; and
resetting the time window in response to receiving the second heartbeat signal.

16. The method of claim 14, wherein the computing system further comprises the plurality of VCEs, and wherein the first VCE comprises:
a storage device configured to store data representing the group of workloads deployed to the first VCE; and
a connect gateway router, wherein the connect gateway router forms a logical endpoint within a logical tunnel mesh for the plurality of VCEs.

17. The method of claim 16, further comprising:
receiving the instruction to transfer the set of workloads; and
transferring, via the logical tunnel mesh and the connect gateway router, at least some of the data stored in the storage device to the second VCE.

18. The method of claim 12, wherein the processing circuitry is configured to execute a multicloud controller, and wherein the method further comprises:
configuring, using the multicloud controller, a disaster recovery controller within the plurality of VCEs, wherein:
detecting the failure of at least the portion of the first VCE comprises detecting, using the disaster recovery controller, the failure of at least the portion of the first VCE; and
outputting the instruction to transfer the set of workloads comprises outputting, using the disaster recovery controller, the instruction to transfer the set of workloads, wherein the processing circuitry is configured to execute the disaster recovery controller; and
configuring, using the multicloud controller, a plurality of heartbeat agents in the plurality of VCEs, wherein the multicloud controller configures a heartbeat agent of the plurality of heartbeat agents in each respective VCE of the plurality of VCEs.

19. A non-transitory computer medium comprising instructions for causing one or more processors to:
communicate with a plurality of virtual computing environments (VCEs), including a first VCE and a second VCE, wherein each of the plurality of VCEs represents at least a portion of a public cloud operated by a different public cloud provider, deploy a group of workloads to the first VCE,
detect a failure of at least a portion of the first VCE in response to determining that a number of heartbeat signal omissions corresponding to the first VCE exceeds a threshold number of heartbeat signal omissions, and
output, to the first VCE and responsive to detecting the failure, an instruction to transfer a set of workloads of the group of workloads to the second VCE, thereby causing a migration of the set of workloads to the second VCE.

20. The non-transitory computer medium of claim 19, wherein the one or more processors are configured to access a plurality of storage devices, wherein the migration of the set of workloads to the second VCE is performed despite the failure of the portion of the first VCE by leveraging replication infrastructure provided by the first VCE.

\* \* \* \* \*